Dec. 8, 1925.

F. M. BALDWIN ET AL 1,564,998

SHAFT AND SLEEVE TYPE AUTOMOBILE SIGNAL

Filed Oct. 20, 1923 2 Sheets-Sheet 1

INVENTOR
FREDERICK M. BALDWIN.
GALUSHA A. BURGESS.
BY Graham + Kerr
ATTORNEYS

Dec. 8, 1925.  F. M. BALDWIN ET AL  1,564,998
SHAFT AND SLEEVE TYPE AUTOMOBILE SIGNAL
Filed Oct. 20, 1923  2 Sheets-Sheet 2
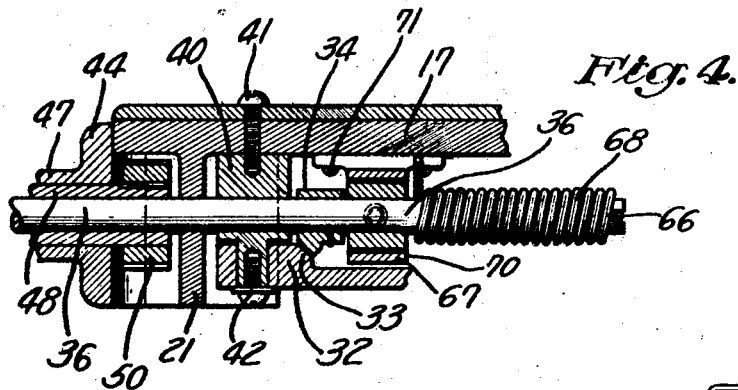
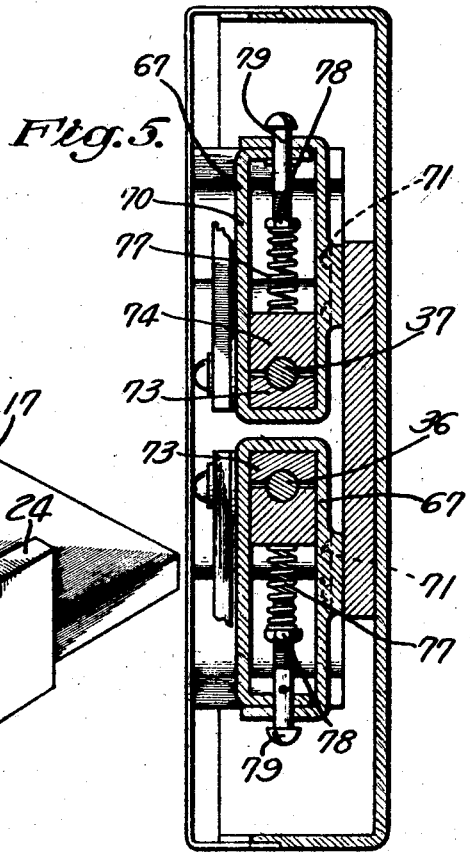
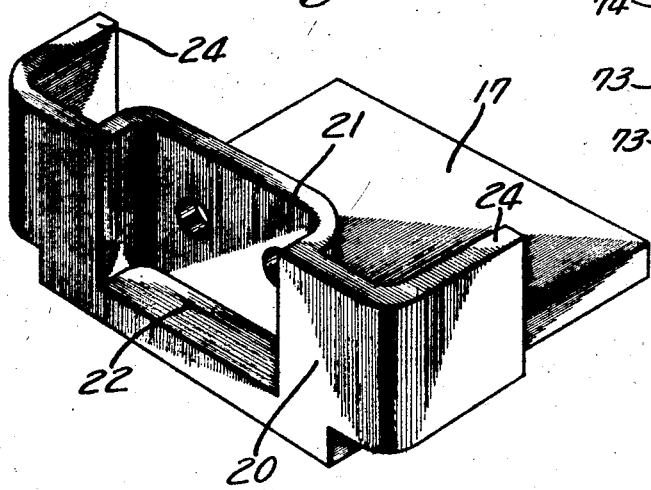
INVENTOR
FREDERICK M. BALDWIN
GALUSHA A. BURGESS
BY Graham + Lewis
ATTORNEYS Patented Dec. 8, 1925.

1,564,998

UNITED STATES PATENT OFFICE.

FREDERICK M. BALDWIN, OF LOS ANGELES, AND GALUSHA A. BURGESS, OF LONG BEACH, CALIFORNIA.

SHAFT AND SLEEVE TYPE AUTOMOBILE SIGNAL.

Application filed October 20, 1923. Serial No. 669,723.

*To all whom it may concern:*

Be it known that we, FREDERICK M. BALDWIN and GALUSHA A. BURGESS, both citizens of the United States, the former residing at Los Angeles, in the county of Los Angeles, State of California, and the latter residing at Long Beach, in the county of Los Angeles, State of California, have invented a new and useful Shaft and Sleeve Type Automobile Signal, of which the following is a specification.

This invention relates to automobile signaling devices and is more particularly a device employing a signaling member arranged for outward extension in the three customary positions employed in imparting signals by an extended hand.

It is an object of the invention to provide a signaling device employing as a display member a replica of the human hand supported upon lazy tongs, and simple and efficient means for manipulating the lazy tongs.

The novel features of the invention reside in the use of pivoted lever members for supporting the lazy tongs and sleeve and shaft means whereby the lever members may be simultaneously or separately swung upon their pivots in such a manner that the lazy tongs will be extended and a signal thus imparted by the hand thereof.

It is a further object of the invention to provide in a device of this character, frictional means for holding the lazy tongs in any position to which they might be extended in imparting a signal.

The especial advantages of the invention and further objects thereof will be made evident hereinafter.

Referring to the drawings which are for illustrative purposes only:

Fig. 4 is a fragmentary section taken on a plane represented by the line 4—4 of Fig. 3.

Fig. 5 is a section taken on a plane indicated by the line 5—5 of Fig. 3.

Fig. 6 is a perspective view of the mounting plate employed in the construction of the device.

Figure 1:
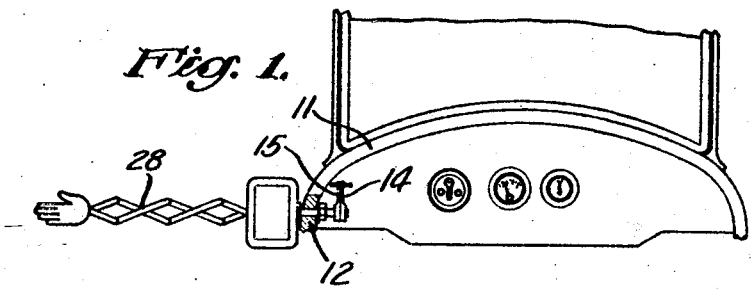
Fig. 1 is a fragmentary view showing the manner in which the signaling device may be mounted upon an automobile.

As shown in Fig. 1 of the drawing, the invention is particularly adapted for use on an automobile indicated at 11, and is particularly suited for mounting on the side wall 12 thereof and is so constructed that it may be quickly attached without necessity of dismounting the signal other than removing the operating handles 14 and 15 thereof.

Figure 2:
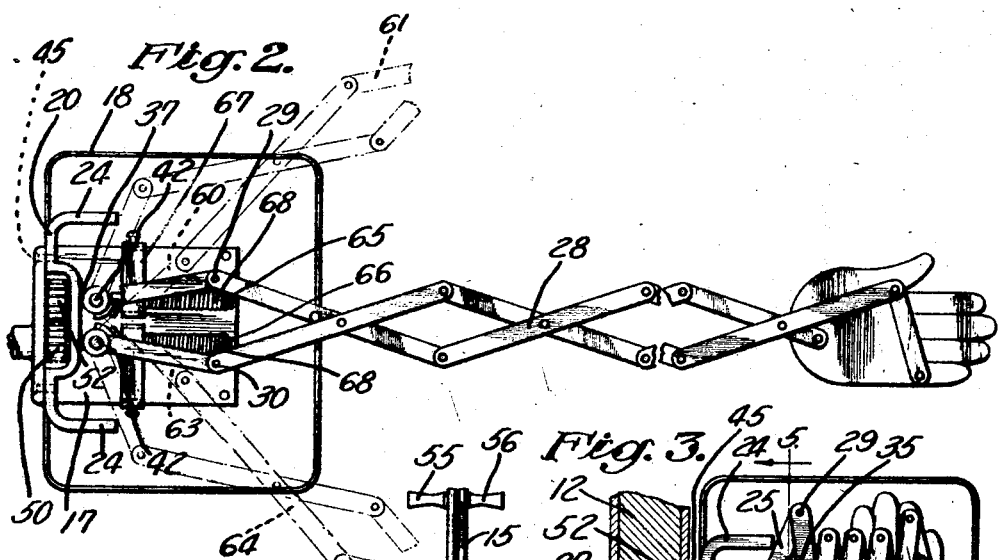
Fig. 2 is a rear view of the signal in extended position, the cover of the casing employed thereby being removed to disclose the interior construction.

As shown in Figs. 2 to 6 inclusive, a mounting plate 17 is employed which has plate members such as indicated at 18 secured thereto so as to form a casing for receiving the mechanism mounted upon the plate 17. Near the leftward end of the plate 17 as shown in Figs. 2 and 6, an upstanding wall 20 is formed, this wall being depressed as indicated at 21 to form a depression or pocket 22, and ends 24 of the wall being turned inwardly to form stops against which lever members 25 and 26 rest during various positions of the lazy tongs 28 which are pivoted at 29 and 30 to the lever members 25 and 26. The lever arms 25 and 26 are provided with bosses 32 at their inner ends which have bevel gear segments 33 formed thereon which engage bevel gear segments 34 and 35 mounted upon shafts 36 and 37. The lever arms 25 and 26 are pivoted on post members 40 which may be secured to the plate member 17 by screws 41, Fig. 4; screws 42 being employed for retaining the lever arm.

It will be noticed that the wall portion 21 and the blocks 40 are bored to receive the shafts 36 and 37 so that ample bearing therefor is provided. Covering the recess 22 is a cover plate 44 arranged for securement by screws 45 and having extended outwardly therefrom a tubular member 47. This tubular member shown as extending in a horizontal plane substantially parallel with that of the signal member 28 is in alignment with the shaft 36 and has therein a sleeve 48 which surrounds that portion of the shaft 36 which extends through the tubular member 47. The inner end of the sleeve 48 has a spur gear 50 rigidly secured thereon, and on the outer end of the sleeve 48, the operating lever 15 is placed. The gear 50 is situated in the recess 22 and engages a gear 52 mounted on the shaft 37. The shaft 36 has the operating lever 14 secured on the end thereof which extends from the sleeve 48.

It will be noticed that the levers 14 and 15 are provided with grips 55 and 56 which extend in opposite directions. By moving both levers simultaneously, the shaft 36 and sleeve 48 are simultaneously rotated, the rotation being transferred through the gears 50 and 52 to the shaft 37. With this manipulation of the levers 14 and 15, the lever members 25 and 26 will be swung rightwardly from the position in which they are shown in Fig. 3 to the position shown in Fig. 2, thus causing the extension of the lazy tongs in a horizontal direction, as indicated in Fig. 1.

If it is desired to extend the lazy tongs in a diagonally upward position, the grip 55 is manually engaged and the lever 14 swung from its normal position of rest, thereupon causing rotation of the shaft 36 and the upward swing of the lever member 26 into the position indicated by the dotted lines 60, Fig. 2, with the result that the lazy tongs are extended in the position indicated by the dotted lines 61.

If it is desired to extend the signal diagonally downwardly, the lever 15 is moved by engagement of the grip 56, thus transferring rotation through the sleeve 48, the gears 50 and 52, and the shaft 37 to the lever member 25, causing it to swing downwardly to the position indicated by the dotted lines 63, Fig. 2, with the result that the lazy tongs are extended as shown by the dotted lines 64.

Figure 3:
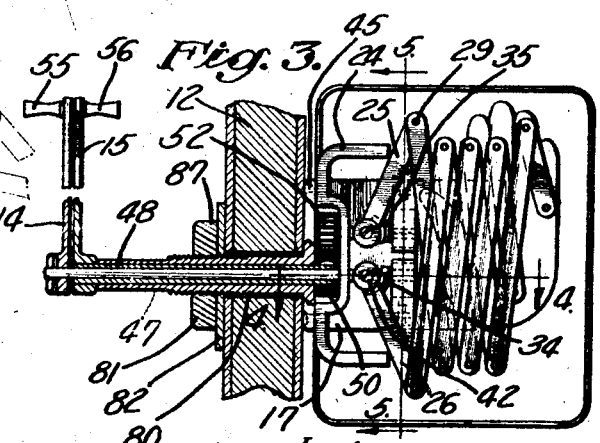
Fig. 3 is a view similar to Fig. 2, but showing the lazy tongs in retracted position.

The inner ends 65 and 66 of the shafts 36 and 37 extend through friction members and have secured on the ends thereon, torsion members in the form of springs 68 which exert rotational forces on the shafts in directions tending to maintain the lever members 25 and 26 in retracted positions against the stops 24, as shown in Fig. 3. The friction members 67 as best shown in Figs. 4 and 5 are comprised of frames 70, mounted on the plate 17 by screws 71 and having therein cooperating friction blocks 73 and 74 which are semi-circularly channeled in their abutment faces to receive the shafts 36 and 37. The blocks 73 preferably rest in the ends of the frames as shown, whereas the blocks 74 are forced against the shafts 36 and 37 by spring members 77 compressed by adjustment nuts 78 mounted on screws 79. By varying the compression of the springs 77, it is possible to vary the frictional engagement of the friction blocks 73 and 74 with the shafts.

The particular advantage and novelty of these friction blocks consist of means tending to resist rotation of the shafts 36 and 37, therefore tending to maintain the lazy tongs in any position to which they may be set. For example, it is desirous that the signal arm shall remain extended in a fixed position until retracted. This is accomplished by the action of the friction blocks which resist rotation of the shaft and thus prevent movement of the lazy tongs from the position to which they are extended by manipulation of the levers 14 and 15.

Another very pronounced advantage in the novel construction is found in the ease with which the device may be secured to an automobile. For securement thereof, it is necessary merely to bore a hole 80, Fig. 3, through a wall 12 of the automobile at the desired point; removing the levers 14 and 15 from the shaft 36 and the sleeve 48; extending the tubular member 47 through the hole 80; and screwing upon the inwardly extending end thereof a nut 81 which may be screwed forcibly against a washer 82 so as to tightly grip the wall 12. The levers 14 and 15 are then replaced and the signal is ready for use.

It will be plainly evident that the cheapness of construction and reduction of the number of parts employed in the signal by use of the tubular member is particularly advantageous especially from a point of economical manufacture. The ease and installation is also of importance and the arrangement of parts in such a manner that they may not be easily forced out of adjustment contribute considerably to the art.

We claim as our invention:

1. In an automobile signal, the combination of: a supporting structure; an extensible signal member supported on said structure; a tubular member extending rearwardly from said structure, said tubular member being arranged for extension through, and attachment to the wall of an automobile body; and torsional transmission means extending through said tubular member for operating said extensible signal member.

2. In an automobile signal, the combination of: a supporting structure; a signal member comprising lazy tongs having a display member at the end thereof; a pair of lever members pivoted on said supporting structure, said lever members being joined to the inner end of said lazy tongs and arranged to operate said lazy tongs; a tubular member extending from said supporting structure; a sleeve extending through said tubular member; a shaft disposed in said sleeve; means for rotating said sleeve and said shaft; means operatively connected between said sleeve and one of said lever members for swinging said lever member; and means operatively connected between said shaft and the other of said lever members for swinging said other lever member.

3. In an automobile signal, the combination of: a supporting structure; a signal member comprising lazy tongs having a display member at the end thereof; a pair of lever members pivoted on said supporting structure, said lever members being joined to the inner end of said lazy tongs and arranged to operate said lazy tongs; a tubular member extending from said supporting structure; a sleeve extending through said tubular member; a shaft disposed in said sleeve; means for rotating said sleeve and said shaft; means operatively connected between said sleeve and one of said lever members for swinging said lever member; means operatively connected between said shaft and the other of said lever members for swinging said other lever member; and friction means mounted on said structure and arranged to resist the movement of said lazy tongs.

In testimony whereof, we have hereunto set our hands at Los Angeles, California, this 11th day of August, 1923.

FREDERICK M. BALDWIN.
GALUSHA A. BURGESS.